United States Patent Office 3,396,924
Patented Aug. 13, 1968

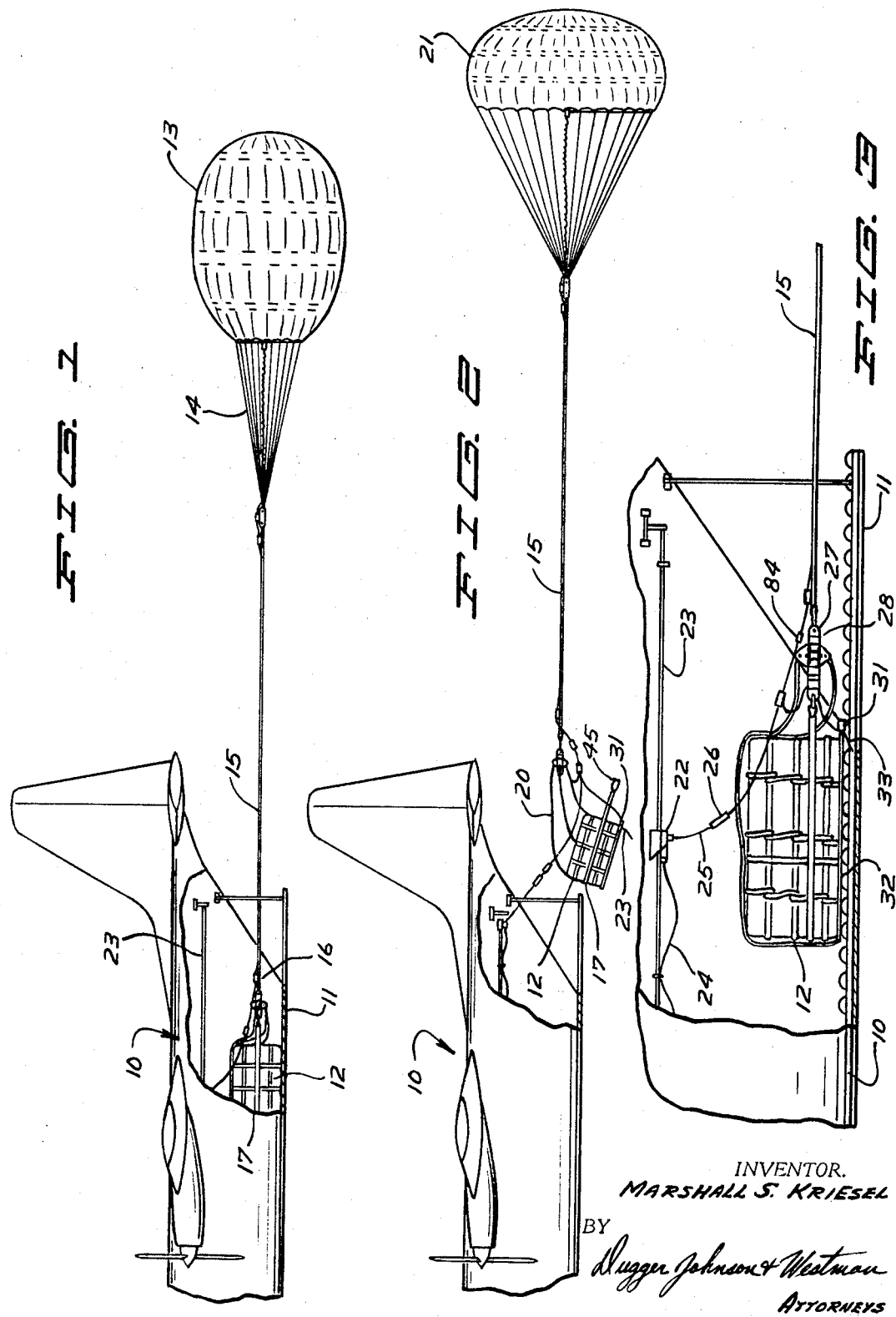

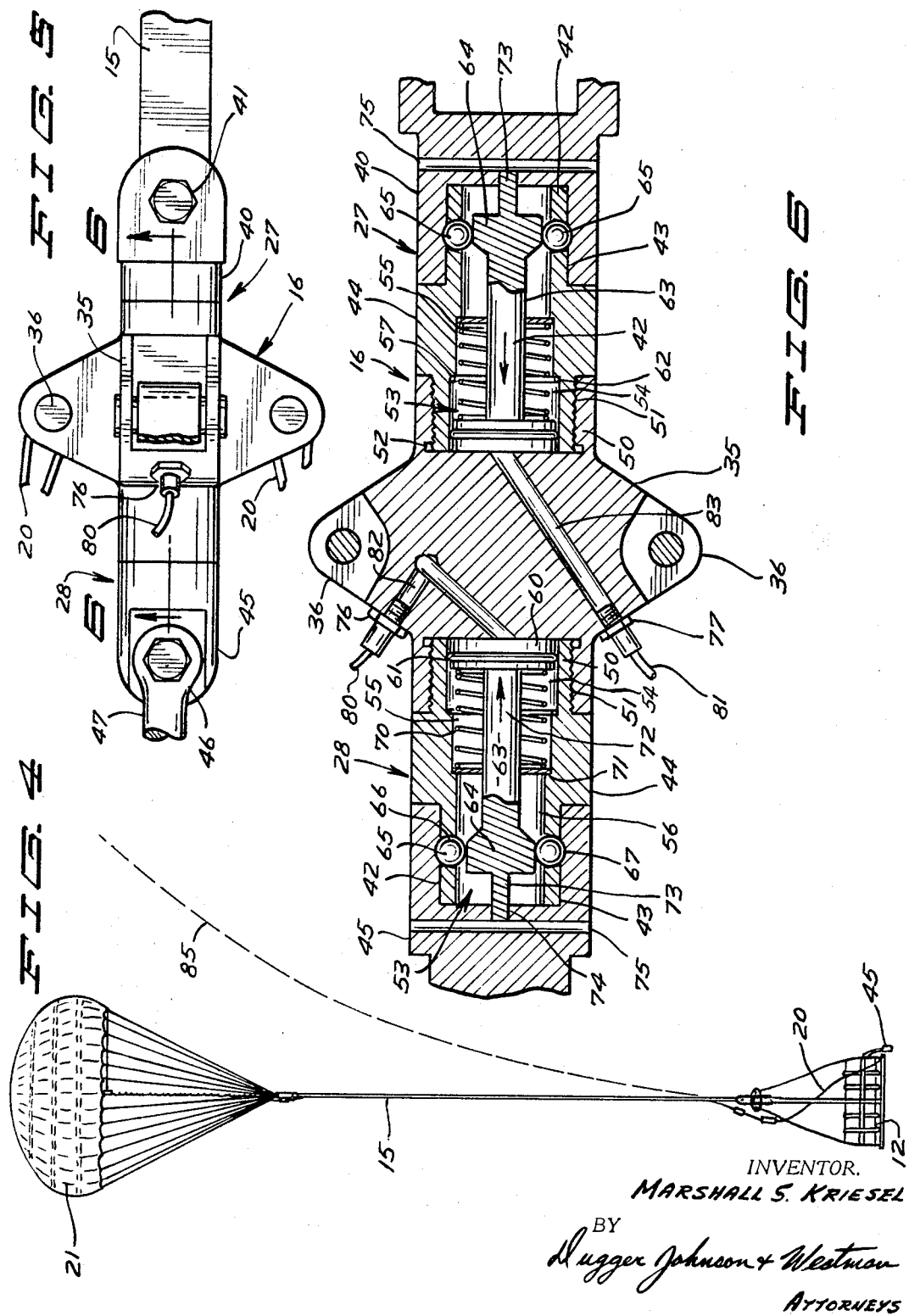

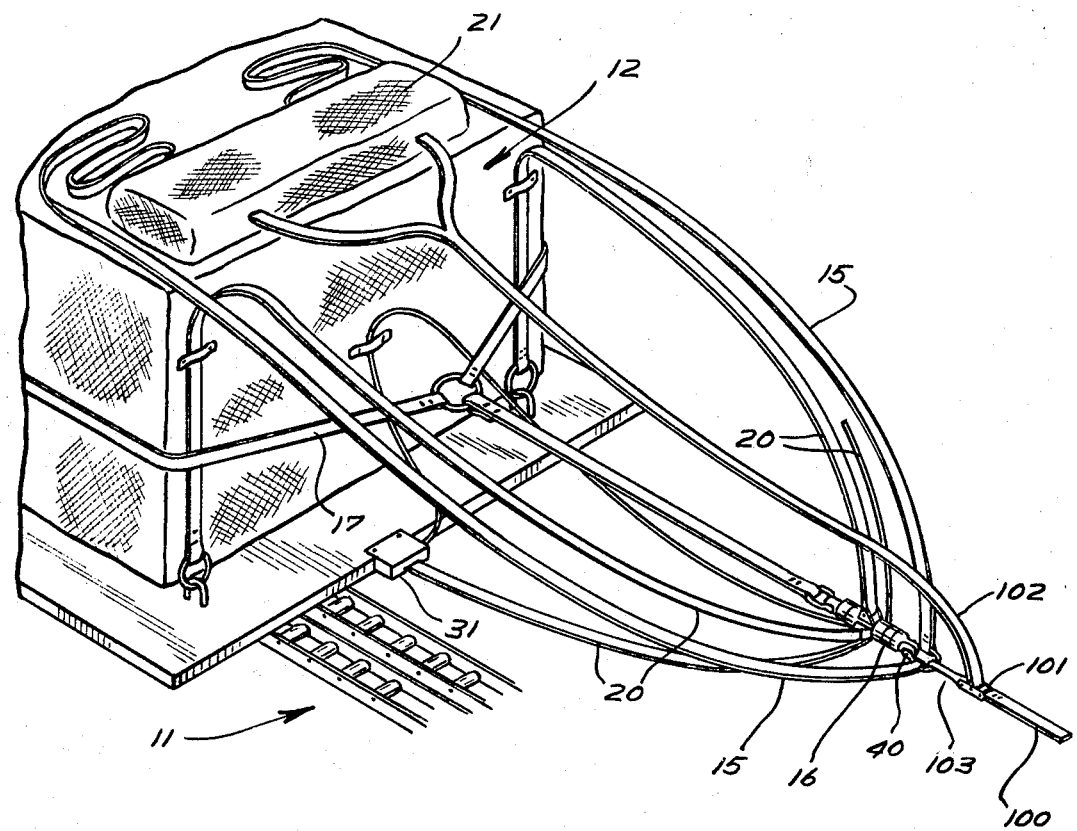

3,396,924
LOAD TRANSFER DEVICE
Marshall S. Kriesel, St. Paul, Minn., assignor to Aerospace Systems Company, Minneapolis, Minn., a corporation of California
Filed Apr. 22, 1966, Ser. No. 544,438
8 Claims. (Cl. 244—137)

ABSTRACT OF THE DISCLOSURE

A load transfer device for use in connection with extraction and dropping of loads from aircraft including a member which has at least two relatively separable sections, and which is in turn attached to a load extraction and support parachute. A first section of said member is attached to the load so that force from the extraction chute will be transferred to the load through both the first and a second section of the member in a substantially horizontal direction to pull the load out of the aircraft. Remotely controlled latch means are provided for separating the two sections of the member. Upon separation, the second section only of the member transfers the force from the extraction and support parachute to the load, through second lines that support the load in direction vertically above it and are of length so they support the load only after separation of the sections. The latch means are shown as being electrically actuated release mechanisms that permit separation of the two sections of the load transfer member.

---

The present invention has relation to load transfer devices, and more particularly to a load transfer device which can be remotely actuated to change the direction of load application or support to give at least two different force directions on a load at diferent times.

The present invention relates to a device which will find its greatest usage in combination with dropping air cargo. It has long been a problem in the removal of cargo from cargo planes with a cargo parachute that there are two different directions of movement of the cargo during the drop. In other words, there is a horizontal pull on the cargo in order to extract it and its supporting pallet or box from the aircraft, and then the load is dropped vertically below the chute. In order to make sure that the cargo is dropped in its upright or proper position, it is necessary that the direction of load from the parachute change 90°. Otherwise the cargo would be dropped on its end which would normally be the front end when loaded in the cargo plane.

A further problem is that the cargo parachute must be capable of being jettisoned if the load pallet becomes fouled or other malfunctions occur in the aircraft. Also it is highly desirable to be able to have the chute fully opened to extract the load. Then it is known that the chute will operate properly and the load will not be lost.

The device of the present invention therefore presents a double duty unit which has means for jettisoning a load cargo, if necessary, and also has means for permitting the direction of force on the cargo to be changed 90° after the cargo has cleared the aircraft floor.

Explosively actuated release mechanisms are utilized and are mounted to a common housing that is attached to exert a horizontal pull on the cargo. One of the release mechanisms will function to jettison the cargo chute by breaking the connection of the extraction strap, and the other release mechanism will separate in a manner to permit the cargo support harness to support the load with the bottom of the cargo closest to the earth after the cargo has been extracted.

In one form of the invention the etxraction cargo chute is deployed in a partially reefed condition and then is unreefed to extract the cargo. The drag of the chute is not great enough to extract the cargo until fully unreefed.

In another form, a drogue chute is deployed in partially reefed condition. At the proper point in travel the drogue chute is unreefed and it in turn releases a large extraction—cargo chute immediately in fully open condition to extract the load. The dereefing operation can be done with precision to obtain accuracy.

The objective in both cases is to have the cargo parachute functioning as the extraction parachute. The cargo chutes are fully deployed as the palletized cargo egresses the aircraft, thus permitting a low-altitude type of delivery for heavy loads. Decreasing the altitude increases accuracy of the drop.

It is an object of the present invention to present a load transfer device which permits changing direction of load support on a cargo.

It is a further object of the present invention to present a load transfer device which includes a separation unit to jettison the parachute from the cargo.

It is a still further object of the present invention to present an integrated load transfer device which has a separation member for jettisoning the load lines.

It is another object of the present invention to present a load transfer device for use with airborne cargo parachutes to permit a substantially horizontally extraction force to be applied to a cargo, after which the load transfer device will be actuated so the load is supported in its original orientation from the cargo parachute during descent.

Other objects are inherent in the specification and will become apparent as the description proceeds.

In the drawings,

FIG. 1 is a fragmentary side elevational view of a cargo carrying aircraft shown with a partially reefed parachute extending from cargo within the aircraft, with parts in section and parts broken away;

FIG. 2 is a view of FIG. 1 immediately after the cargo has been extracted from the aircraft;

FIG. 3 is a fragmentary enlarged view of the cargo when it is in place within the aircraft;

FIG. 4 is a view of the cargo carrying parachute and attached cargo after the load transfere device of the present invention has been actuated;

FIG. 5 is a top plan view of a load transfer device made according to the present invention;

FIG. 6 is a sectional view taken as on line 6—6 in FIG. 5; and

FIG. 7 is a perspective view of a modified arrangement of the parachutes when a large cargo is to be dropped.

Referring to the drawings and the numerals of reference thereon, a cargo carrying aircraft illustrated generally at 10 is provided with platform 11 on which cargo or load 12 is mounted. The aircraft has an open rear door as shown which forms when open, a platform extension on which the cargo or load 12 can slide rearwardly.

The cargo is secured within the aircraft with calibrated or breakaway couplings so that when the extraction load on the cargo becomes great enough, the breakaways will release and the cargo will be pulled rearwardly out of the plane.

The basic consideration behind the use of the load transfer device of the present invention is that the extraction parachute for the load will always be the drop parachute as well. In other words, it can always be determined that the parachute which is being used to drop the load at its proper rate of descent is also used to extract the load. This insures that the drop parachute will be fully unfurled prior to the time that the load is extracted from the aircraft. In previous systems where an extraction chute was used in addition to a drop parachute, particularly where there were very heavy cargos to be dropped, it could happen that the main drop parachute would not open and the cargo would be lost.

Further, by insuring the exact time of extraction, the accuracy of the drops, particularly with heavy loads, can be increased. The fact that the drop parachute is fully unfurled at the time the load is extracted also makes it possible to descend to much lower altitudes for the drops of heavy equipment. Where the load was separately extracted and the drop parachute had to open after the load was extracted, the altitudes during operation had to be much higher causing inaccuracies, and actually supplying the enemy with ordnance intended for friendly troops.

In the description, the device of the invention can be used in two ways. For the purpose of simplicity, the examples will illustrate the usage of a single drogue-extraction-drop parachute. A description is included for an arrangement or method of dropping load where the cargo parachutes are too large to act as drogue parachutes. In that instance, a separate, partially reefed drogue parachute will be released, and upon de-reefing, the drogue parachute will extract the main cargo parachute. Then the cargo parachute will open and will act as the load extraction and will drop parachute. The de-reefing of the drogue parachute will insure that initiation of the drop will occur at the desired point in travel of the aircraft.

In the specification, the term "cargo parachute" will mean the extraction and drop parachute for the cargo.

The cargo 12 is illustrated on a pallet, but it is to be understood that the present system will also work well where other cargos may be dropped such as jeeps or vehicles. In cases where a vehicle is being dropped, it is extremely important that the vehicle drop so its wheels touch the ground first to avoid damage.

As shown in FIG. 1, a drogue chute 13 is deployed (in the forms of the invention this drogue chute 13 can be the chute for extracting the main cargo chutes, or can be the cargo chute itself depending on the size of cargo chute needed). In any event, the drogue chute, as shown, is partially reefed with a reefing line that prevents the chute from opening fully. The suspension lines 14 for the chute are attached to an extraction strap 15. The extraction strap 15 is attached through the load transfer device to two sets of straps on the cargo. A cargo extraction strap 17 is positioned around the cargo as shown, and can exert a substantially horizontal pull from the extraction strap 15 through the load transfer device onto the cargo. In addition, the load transfer device has means for attaching it to suspension lines 20 which are mounted on the pallet and cargo to support the cargo in a vertical direction.

At the proper time, the cargo parachute 21 is deployed. This cargo parachute is deployed either by unfurling the drogue chute 13 through the actuation of a reefing line cutter that will cut the line holding the chute 13 in its partially reefed condition so that it will expand to its known diameter and become the cargo parachute 21 or the chute 13 can be used for extracting a cargo parachute upon the cutting of the reefing line. The reefing line cutter is an electrically actuated guillotine type cutter and is shown in detail in United States application Ser. No. 496,887, filed Oct. 18, 1965 of which application the present applicant is a co-inventor.

Once the cargo parachute 21 has unfurled, the load on the extraction strap 15 connected to the cargo parachute will be sufficient to release the breakaway catches holding the cargo 12 in the plane. When this happens, the load will move rearwardly on the ramp 11 toward extracted position. The couplings for the load are calibrated so that they will not release the load until the extraction force is great enough. This force is determined by the amount of drag exerted by the fully unfurled cargo parachute 21.

The electrical controls for the reefing line cutter and the controls for the load transfer device (which includes a jettisoning section) are connected to a trolley which is slidably mounted for movement along the normal cable 23 to which paratroopers will attach their static lines when they are jumping. This cable 23 is conventional in cargo airplanes. The trolley 22 serves as a mounting junction box and is controlled through and also gets power through a line 24 from the regular aircraft power system and controls at the front of the aircraft. The electrical signals are carried to the load transfer device and the reefing line cutter through a control cable assembly 25 connected to the trolley 22. The cable assembly 25 includes a breakaway connector 26 which will separate when the cargo is extracted on the plane.

The load transfer device 16 has basically two sections as will be more fully explained later. One section 27 will separate to permit the jettisoning of the main cargo chute 21 and any drogue chutes which may be used and a load transfer section 28 is separated during the load transfer function. The load transfer section includes an explosively actuated device (called a squib and known in the art) which, upon receiving an electrical charge will explode and in a manner to be explained, will cause separation at the load transfer point.

The explosively actuated device for the load transfer section 28 is controlled through a self-contained switch 31 attached to the edge of the pallet 32 for the cargo 12. The switch 31 has a small actuator arm 33 which is normally held in safety position, but once the rear edge of the pallet 32 clears the ramp 11, the arm 33 will be free to drop down under the force of gravity and will close a switch to actuate the squib to thereby cause separation at the transfer section 28 of the load transfer device. It is subsequent to this actuation that the breakaway connector 26 will separate.

Referring now specifically to the load transfer device shown in FIGS. 5 and 6, the device includes a main housing 35 which has suitable shackles 36 for mounting the suspension lines 20 running to the load. The shackles can be formed in any desired manner and as many shackles as necessary to support the load can be provided. The load transfer device 16 includes the jettisoning section 27 and the load transfer section 28. The two sections operate in the same manner, in other words, they are identical in construction except they serve different functions. The jettisoning section includes a first member 40 to which the extraction line 15 leading to the cargo parachute is attached. The extraction line can be attached in any desired manner. As shown it is mounted over a bolt 41 passing through provided openings in the member 40. The first member 40 is the actual element which will separate from the load transfer device upon jettisoning of the cargo parachute. The first member 40 as shown has a cylindrical chamber defined in the end opposite from the end where bolt 41 is attached and this cylindrical chamber 42 is adapted to slide over an end section 43 of a center housing 44. In order to simplify the description, the same numbers will be utilized with the load transfer section except for the members that separate. The breakaway section 28 has a first member 45 and this member 45 has an end portion 46 adapted to receive a clevis or shackle 47 to which the cargo load extraction line 17 is attached.

The center members or sections 44 have second end portions 50, which are threadably mounted as at 51 into the respective ends of the main housing 35. Suitable O rings 52 are utilized for sealing the end portions 50 with respect to the housing 35. The center housings of the load transfer and jettisoned sections are tubular, as shown, and have separate main chambers 53 that are divided into three different portions. In each first portion 54 is of the greatest diameter, and a second portion 55 is of lesser diameter, while a third portion 56 is of smallest of all. Each of the first portions is of size to house a separate piston member 60 which is sealably slidably mounted in the first portion and has an O ring 61 around the periphery thereof to effect the sealing. In each section the junction between the first portion 54 and the second portion 55 of the opening 53 forms an annular shoulder 57 on which another O ring 62 is mounted.

The pistons 60 have shanks 63 integral therewith and extending through the second portion of the opening to the third portion. The shanks 63 have ball retainers 64 of relatively large diameter and these retainers are each aligned with a plurality of spherical balls 65 which pass through provided openings 66 in the end portions 43 of the center housing and protrude into aligning receptacles 67 defined in the inner surfaces of the interior chambers of the two end portions 40 and 45, respectively.

Springs 70 are positioned within the respective first and second portions 54 and 55 of the openings 53 and stop against shoulders 71 between the second and third portions of the openings. Each spring also abuts against the rear face of its respective piston 60 and resiliently urges the piston in direction as indicated by the arrows 72. It should be noted that the pistons cannot move in direction opposite from that indicated by arrows 72 past the respective shoulders 57.

In addition, a separate extractor finger 73 is integral with each of the ball retainers 64 and they extend through provided openings 74 in the end portions 40 and 45, respectively. The openings 74 join cross sighting holes 75 drilled in each of these end portions.

When the pistons move in direction opposite from that indicated from arrow 72 a sufficient distance, the ball retainer 64 will move rearwardly to position where the ball 65 can move inwardly out of the receptacles 67 and this will permit the end portions 45 or 40 (depending on which piston has been actuated) to separate from the base housing 35 and the center housing 44 of the respective members.

The pistons are actuated through the utilization of small explosive devices, termed squibs, and indicated at 76. The squibs are available and are known in the art. The squibs are initiated upon receipt of an electrical signal carried through their respective lines 80 and 81. The first squib 76 for the load transfer section is open through a passageway 82 to the interior of the first portion 54 of the chamber 53 and, when the squib has been actuated, gas pressure will be generated in the passageway 82 to force the piston in direction opposite that indicated by arrow 72 a sufficient distance so that the ball 65 will be released from the receptacle 67 and the member 45 can separate from the rest of the device.

In order to insure that there is separation, the ejector fingers 73 will pass into the sighting hole 75 (the sighting hole is used only to make sure that the ejector finger is not in the hole prior to initiation) and will force the end section 45 away.

The passageway 83 is provided for the squib 77 and leads into the first section 54 of the chamber 53 for the jettison portion of the load transfer device. Again, when the squib 77 is actuated (this will be when the cargo chute is to be jettisoned because the cargo itself is fouled up in the plane and cannot be removed or for some other reason or malfunction) gas pressure will move the jettison piston 60 open to the chamber 83 in direction opposite that indicated by arrow 72 and permit the member 40 to be released, thus releasing the cargo parachute but permitting the cargo to remain in the plane.

Now, referring again to the operation of the system, once the cargo parachute 21 has been completely unfurled, the load retaining members for the cargo 12 will breakaway permitting the cargo 12 to be extracted rearwardly by the chute 21 acting on the extraction line 15, load transfer device 27 and extraction line 17. It can be seen that the pull will be in a horizontal direction. If the load should become fouled up or difficulties should be encountered, the cargo chute 21 can be jettisoned merely by actuating a switch which will send an electrical current through line 81 initiating the explosion in squib 77, actuating that particular piston 60 in direction to release the end member 40 to which the extraction line 15 is attached. The load will just remain in the plane and the cargo chute will be lost. An electrical breakaway coupling 84 will release to permit this to happen without breaking the main line of the controls.

However, if all works well, after the cargo chute is deployed the cargo will be pulled out of the plane, as shown in FIG. 2. At this time, the arm 33 will actuate the switch 31 so that an electrical current will be passed through line 80 to the squib 76 initiating an electrical detonated explosion. This will create a gas pressure in passageway 82 and force the load transfer piston 60 in direction opposite that indicated by arrow 72 until the end member 45 separates from the inner section 35 of the load transfer device. In other words, the load transfer section 28 will separate in two parts. Then the load from the line 15 will no longer be carried through the extraction line 17 on the cargo. Instead, the cargo will tend to drop down under the weight of gravity and the load suspension lines 20 will pick up the load from the cargo. As the cargo tends to drop, it will follow a trajectory line indicated generally at 85. The suspension lines 20 will support the load from the cargo chute through the center section 36 and jettison section 27 of the load transfer device and line 15.

This gives greater accuracy to the dropping of heavy materials, in particular, because the cargo chute 21 does not have to be fully unfurled, or deployed, until the aircraft is over the target area and it is known that the chute will be operating satisfactory in a fully unfurled condition before the load is released. In order to insure this, the breakaway connectors or hold-down straps for the cargo 12 will be calibrated to resist loads which are substantially smaller than the drag exerted by the fully unfurled cargo parachute 21. The extraction method gives the ability to fly in at low altitudes, have the cargo chute fully deployed before the load is extracted making sure that the load will be supported in its descent and that the cargo chute will be open in time to support it. Also the load will drop onto its pallet or support wheels in the case of a vehicle, and this will lessen problems in manufacturing support pallets and will lessen the damage that can be caused during the drop.

Referring specifically to FIG. 7, the rigging utilized at the time a separate drogue chute 13 is used is shown schematically. Extraction line 100 would be attached to the partially reefed drogue chute such as that illustrated at 13. The extraction line has an attached shackle 101 which has two connections. A first connection is attached to a cargo chute extraction line 102. The packed cargo chute 21 is placed on top of the load 12 in the aircraft and rests there until such time as it is pulled out by the drogue chute. Once the drogue chute was unfurled (for example if 13 was the drouge chute) by actuating the explosive cutter for the reefing line, a calibrated breakaway connector 103 would separate (the load from the drogue chute would increase to cause this to breakaway) and the line 102 would be pulled out by line 100 to extract the cargo chute 21 that is stored on top of the cargo. This is done when the plane is approaching the drop site and can be done with precision. Once the cargo chute is dragged out, it immediately opens fully to that position as shown in FIG. 2 and the extraction line 15 (as shown in FIG. 6 can be two extraction lines 15) attached to the end 40 of the load transfer device 15 exerts the pull to extract the cargo immediately. The operation of the cargo chute is exactly the same as before, except the drogue chute is used for extracting the main cargo parachute. This is done by using the calibrated breakaway 103 which would not let the cargo parachute release until the drogue chute is fully unfurled. In this manner, a larger cargo parachute 21 can be used and still deployed at low altitudes and immediately adjacent the drop area, and further, can be deployed at a precise point in travel in order to make the drop more precise. The drogue chute can be unfurled at the proper minute to cause separation of the breakaway 103 and at this time the main cargo chute is pulled out and immediately unfurled. Once the cargo chute unfurls, the hold-down connections for the cargo 12 are broken causing extraction of the cargo and the operation previously described.

What is claimed is:

1. A force transfer device comprising a housing, said housing comprising first and second sections which are relatively separable, means to effectuate separation of said housing sections, a load member, first force transfer means attached between said first section and the load in a first position on the load so as to exert a force coming from the first section on the load in a first direction, second force transfer means attached between said second section of said housing and said load in a second position on the load oriented at a preselected relationship to the attachment position of the first means, third force transfer means to transfer force from external means to said second section, said second means being oriented to transfer force to the load from the second section only when the first and second sections are separated.

2. The combination as specified in claim 1 wherein said first and second sections are separable in response to an electrically actuated explosive means.

3. A mechanism for removal of cargo from the rear of an aircraft during flight comprising in combination, a parachute means, said parachute means having a flexible main extraction line attached thereto, a load transfer device attached to said extraction line, said load transfer device comprising a main housing body, a first separable section and a second separable section on the main body, said extraction line being attached to said second separable section, load carrying strap means attached to said first separable section to exert a force on said load through said extraction line in a generally horizontal direction with respect to normal orientation of said load, second load suspension means attached to said main body section of said housing and effective to support said load whenever said first section has been separated from said housing body, said first separable section being actuated by electrically detonated explosive means to separate from said main body housing, a switch for actuating said electrically operated explosive means, means to actuate said switch upon removal of said load from said aircraft to thereby cause said load to be suspended from said parachute by said extraction line, said second separable section, said main housing body, and said second load suspension means.

4. The combination as specified in claim 3 wherein said second separable section is actuated in response to an electrical signal to separate from said main body, thereby to release said extraction line and said parachute.

5. The combination as specified in claim 4 and a second parachute which is operable to extract said main cargo parachute when the drag from said second parachute exceeds a predetermined amount.

6. A suspension system for a load including a main housing, a separable section mounted on said main housing, latch means normally retaining said separable section on said main housing, latch release means operable to release said separable section from said main housing upon receipt of a predetermined signal, first means to connect said first section to said load to transfer a force from said main housing to said load in a first direction, second means connected from said load to said main housing so as to transfer a force from the main housing to said load in a second direction at substantially 90° to said first direction when said load is receiving a force through the second means from said main housing, said first and second means being of selected length so said second means is effective to transfer force to the load from the main housing only upon separation of the separable section from said main housing.

7. The combination as specified in claim 6 and an extraction line attached to said main housing and a cargo carrying parachute attached to said extraction line.

8. The combination as specified in claim 7 and a second section separably mounted on the housing, the extraction line being attached to said second section, and remotely controlled latch means for effecting separation of said second section and the main housing.

References Cited

UNITED STATES PATENTS

| 3,032,356 | 5/1962 | Botsford | 244—137 |
| 3,113,751 | 12/1963 | Cotton | 244—137 |
| 3,141,641 | 7/1964 | Beadle et al. | 244—138 |
| 3,251,278 | 5/1966 | Royster | 285—18 X |

FOREIGN PATENTS 1,047,735  7/1953  France.

MILTON BUCHLER, *Primary Examiner.*

T. W. BUCKMAN, *Assistant Examiner.*